June 23, 1931.  H. CLEMENT  1,811,349
OPHTHALMIC TRIAL FRAME
Filed Jan. 4, 1927   2 Sheets-Sheet 1

INVENTOR
Hans Clement
BY
Stockbridge & Borst
ATTORNEYS

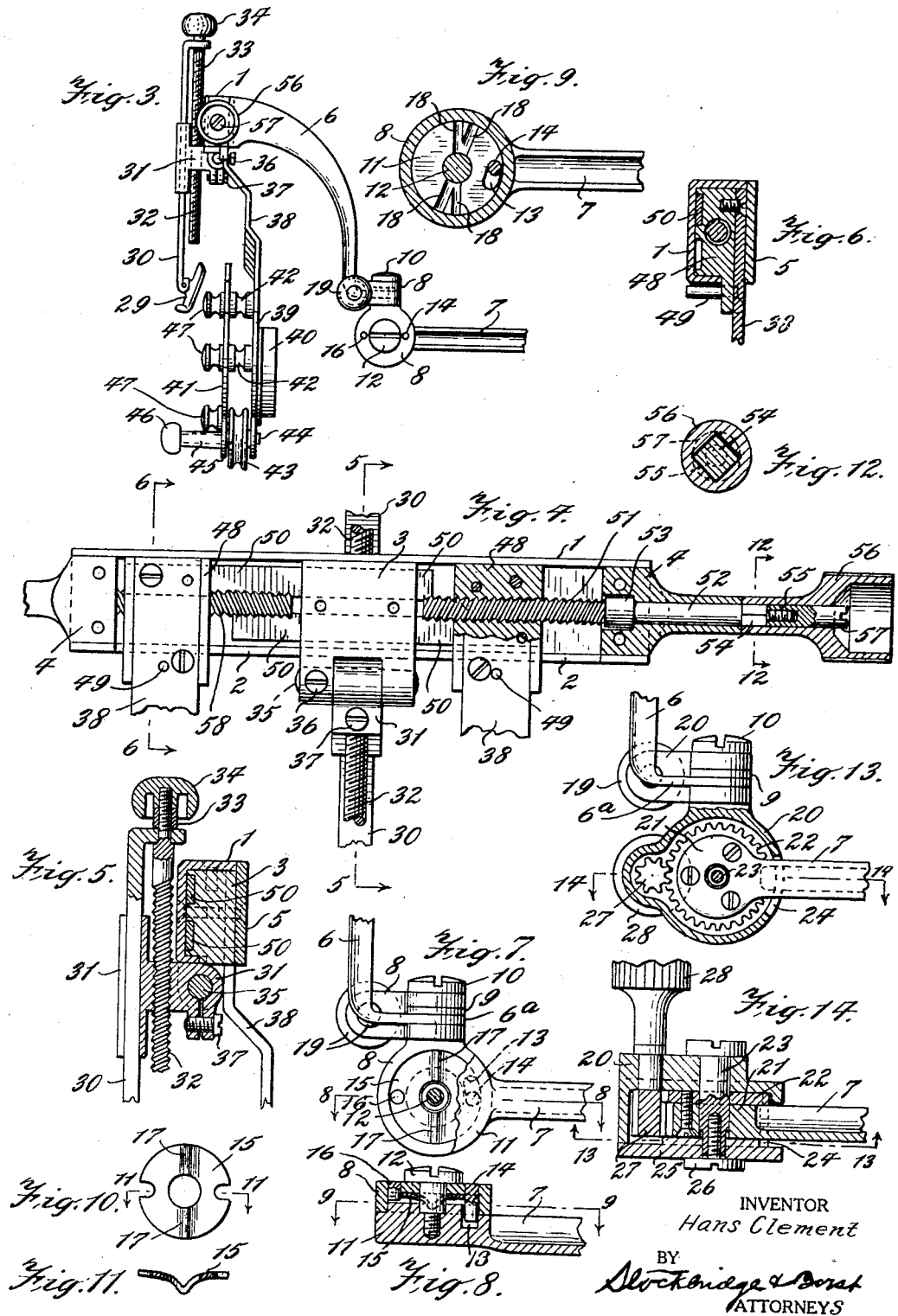

Patented June 23, 1931

1,811,349

UNITED STATES PATENT OFFICE

HANS CLEMENT, OF NEW YORK, N. Y., ASSIGNOR TO GENERAL OPTICAL CO., INC., A CORPORATION OF NEW YORK

OPHTHALMIC TRIAL FRAME

Application filed January 4, 1927. Serial No. 158,841.

Heretofore considerable trouble has been had with trial frames in various respects and particularly as to maintaining the axes of the trial case lenses in accurate alignment. This latter difficulty has been due to a plurality of causes, in many instances several or all of which are objectionably present. Chief among these causes have been a lack of proper rigidity or stiffness in parts of the frame which should be rigid, the subjection of such frame parts to distorting and bending strains when the trial frame is fitted to the head, and also there has generally been objectionable looseness in slidably guiding the trial case lens holders on the main frame part for pupillary adjustment, thereby permitting angular movement of the lens holders which destroys the axial alignment of the lenses. Furthermore, these trial frames have in many cases been uncomfortable to the patient, inconvenient to operate, and fatiguing to the patient, and have unduly consumed the time of the operator and have rendered accurate tests difficult.

Among the objects of this invention is to provide an improved trial frame which will be free from the above noted objections. Hence among the objects of the invention are to provide a trial frame which will be comfortable to the patient, which will have rigidity in the parts that should be rigid while at the same time providing sufficient resilience in other parts that should be more or less flexible and resilient, the various adjustments of which may be made quickly and accurately, which will be convenient for the operator to adjust and operate, which will not fatigue the patient during the tests, which will be of a superior mechanical construction throughout, and by which the making of accurate tests is facilitated. Other objects are lightness in weight, inexpensiveness of manufacture without sacrificing quality, facility in manufacturing, and the production of a trial frame which will meet all practical requirements. Other objects and advantages of the invention will hereinafter appear.

The invention includes various features of construction and combinations of parts as will appear from the following description.

The embodiment of the invention shown in the accompanying drawings will now be described and thereafter the invention will be pointed out in claims, reference now being had to the drawings, in which:

Fig. 3 is a side elevation of the same as viewed from the right of Fig. 1 with the rear end portions of the temples broken away to save space on the drawings;

Fig. 4 is an enlarged rear elevation of the main frame part together with its immediate adjuncts and parts, the rear cover plate being removed, other parts being in vertical section and other parts broken away;

Fig. 5 is a vertical section on the line 5—5 of Fig. 4 with some parts appearing in elevation;

Fig. 6 is a vertical section on the line 6—6 of Fig. 4;

Fig. 7 is an enlarged elevation from the inner side and partly broken away, showing the pivotal connection of the temple at that side to the temple arm;

Fig. 8 is a horizontal section on the line 8—8 of Fig. 7;

Fig. 9 is a section in a vertical plane taken on the horizontal line 9—9 of Fig. 8;

Fig. 10 is a side elevation from its inner side of a spring detent disc employed in connection with the horizontal pivot of the temple and which similarly appears in part in Fig. 7;

Fig. 11 is a horizontal section on the line 11—11 of Fig. 10, and shows the spring detent disc as it appears in Fig. 8;

Fig. 12 is a further enlarged vertical section on the line 12—12 of Fig. 4;

Fig. 13 is view similar to Fig. 7 but shows a modified construction of the horizontal pivot of the temple, and is partly in section in a vertical plane taken on the horizontal line 13—13 of Fig. 14; and Fig. 14 is a horizontal section on the line 14—14 of Fig. 13.

Figure 1:
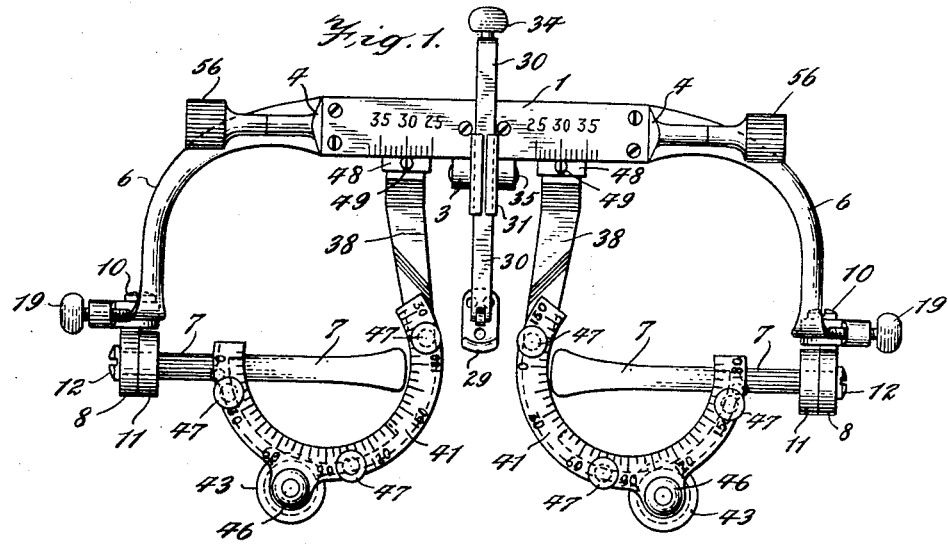
Fig. 1 is a front elevation of a complete trial frame embodying the invention.

The construction of the trial frame shown in the drawings as an embodiment of the invention will now be particularly described.

Figure 2:
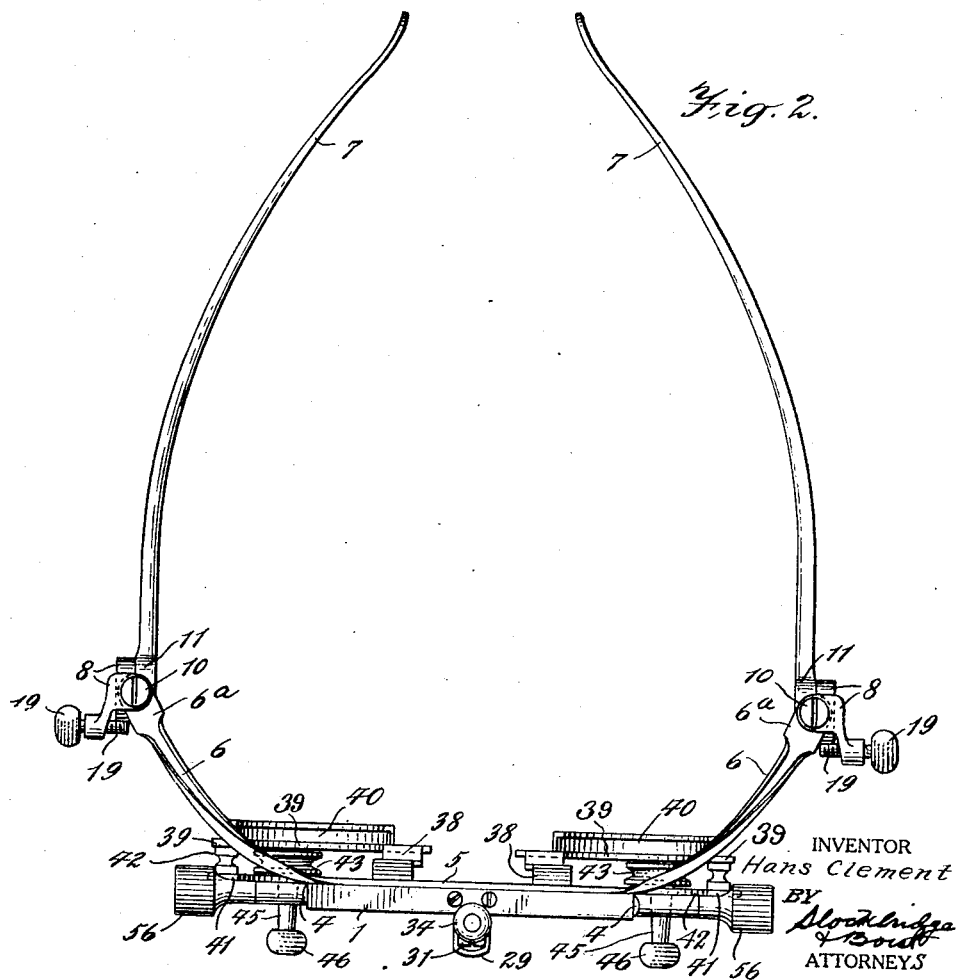
Fig. 2 is a plan view of the same.

A straight rigid channel-shaped cross bar 1 forming a main frame part has upper and lower flanges directed rearwardly of which the lower flange is cut away or has a portion omitted to form a longitudinal slot 2 which extends through the major part of the length of the bar. This cross bar may be made from a suitable metal such as duralumin. At the middle of the length of the cross bar 1 a center block or anchor block 3 of generally rectangular shape fits closely in the channel of the cross bar 1 flush with its upper flange and extends downward through the slot 2 where it is notched both around and into the lower flange, as is perhaps shown most clearly in Fig. 5. This middle block is firmly secured in place by means of a pair of front screws as shown in Fig. 1 and a pair of top screws as shown in Fig. 2, some of these screws also appearing in dotted lines in Fig. 5. It will be noted that this block 3 is thus held against any movement whatever in any direction relatively to the cross bar 1. End blocks 4 closely fit in and close the ends of the channel in the bar 1 outwardly from and flush with the ends of the slot 2, and each of these end blocks is firmly and rigidly secured in place by means of a pair of front screws as shown in Fig. 1. A flat rear cover plate 5 closes the channel of the bar 1 with the exception of its slot 2 and is firmly and rigidly secured in place thereon by means of three pairs of screws entering respectively the center block 3 and the end blocks 4, as is indicated by the screw holes shown in Fig. 4. It will be noted that the cover plate 5 virtually or in effect forms a component part of the cross bar 1 so that it reinforces the latter to increase its strength and rigidity and forms therewith a tubular bar of rectangular cross section having the slot 2 along the bottom thereof adjacent the closure plate 5.

The cover plate or flat strip 5 is continued outwardly at its opposite ends to form in one piece therewith and as extensions thereof a pair of temple arms 6 which extend on gradually merging curved lines outwardly and rearwardly and downwardly in substantial conformation with the shape of the head of the patient, these temple arms being of a rounded shallow channel shape in cross section and they taper gradually from their inner towards their outer or lower ends where they each are turned rearwardly and slightly outwardly on a slightly rounded right angle to form short horizontal flat end portions 6a. These temple arms 6 have considerable rigidity and are only slightly yieldable and are what is believed may be properly designated as stiffly resilient, the purpose of which will presently appear. The temple arms 6 together with the connecting cross piece 5 forms a one piece temple yoke which carries and assists in supporting the cross bar or main frame bar 1 together with the several parts mounted on or carried thereby. Stainless steel has been found a suitable material for this temple yoke, which, as above noted, comprises the cross piece 5 and the temple arms 6 which form outward continuations or extensions thereof.

A temple 7 is connected to the free end portion 6a of each of the temple arms 6 through a double pivot or universal joint connection including a vertical pivot and a horizontal transverse pivot, in the construction shown in the drawings the temple 7 having its horizontal pivot upon an interposed pivot block 8 which has a vertical pivot for the temple on the end 6a of the temple arm 6. The pivot block 8 at its top is horizontally bifurcated at its inner side to receive the end 6a of the temple arm 6 together with a friction washer 9, and a terminally screw threaded shouldered pivot stud or pivot screw 10 forms the vertical pivot and screws at its lower end into the lower part of the bifurcated pivot block 8, this pivot screw 10 exerting sufficient clamping action to prevent any undesirable looseness at this pivotal connection.

The lower part of the pivot block 8 is of circular flanged or cup shape, as shown in Figs. 7 and 8, with its flanged side directed inwardly. The temple 7 is provided with a circular flat head 11 the inner side of which is shouldered to form a circular boss which fits snugly within the rim of the cup formed by the pivot block 9 for pivotal movement therein. A shouldered terminally screw threaded pivot stud 12 pivotally passes centrally through the bottom of the cup of the pivot block 8 and is countersunk in and screws into the temple head 11. In the drawings, for simplicity of illustration, the temple head 11 is shown as formed in one solid piece but obviously if so desired for manufacturing reasons the outer parts thereof may be formed as a hollow shell in one piece with the temple 7 while the inner part of this head 11, including the boss formed thereon, may be a separate piece set into the shell and firmly retained in place therein in any convenient way such as by means of solder or otherwise.

The extent of the angular movement permitted of the temple arm 6 on the temple 7 is positively limited to the desired arc by means of cooperating stops shown as an arcuate slot 13 in the inner face of the temple head 11 and a stop pin 14 rigidly carried by the cup of the pivot block 8 and projecting into this slot, as shown in Figs. 7, 8 and 9. It will be noted that an annular space is provided between the inner face of the boss on the temple head 11 and the inner face of the bottom of the cup of the pivot block 8, and within this annular space there is provided a friction device in control of the rocking or tilting movement of the temple arm 6 on the temple 7, such device most desirably being an automatically-releasing spring detent device for yieldably holding the temple arm at each of its limits of angular movement relatively to the temple. For this purpose there is shown a spring disc 15, centrally perforated to fit over the pivot stud 12 and notched at its opposite edges to be anchored by means of one of these notches to the stop pin 14 and at its opposite edge to another shorter pin 16 projecting into the intervening space from the bottom of the pivot block cup by which it is rigidly carried. This spring detent disc 15 is bent or indented to form a V-shaped diametral ridge 17 which may snap into and yieldingly engage in either one of a pair of diametral crossed grooves 18 shown as provided in the adjacent face of the temple head 11, such engagement taking place at either one or the other of the limits of the pivotal movement. It should be noted that the upper part of the pivot block 8 is provided with a forwardly extending arm at the outer side of the lower end of the temple arm 6 and that this arm on the pivot block carries an inwardly directed screw 19 having an outer head providing for its manipulation for thereby, to the desired extent, positively forcing the temple 7 inward towards the other temple 7 by the engagement of the inner end of this screw with the temple arm 6.

It is to be noted that each of the temples 7 is of rounded trough shape or substantially of a U shape in cross section with its smooth rounded side directed inward towards the other temple to come in contact with the head of the patient and thus contribute a feeling of comfort, whereas heretofore commonly the temples of trial frames have had sharp edges along the inner sides which gave a feeling that they cut into the skin. The temples 7 are properly resilient and together with the somewhat stiff resiliency of the temple arms 6 cause the trial frame to cling firmly to the head when the temple clamp screws 19 are properly adjusted.

In Figs. 13 and 14 there is shown a somewhat modified construction of the horizontal pivotal connection of the temple 7 to the temple arm 6, the vertical pivotal connection remaining the same as above described. In this construction a modified pivot block 20 has a cup portion of sufficient depth to receive completely therein a slightly modified flat head 21 of the temple 7. Adjacent the bottom of the cup a spur gear 22 is secured to the temple head 21, for example, by means of screws as shown, and a horizontal pivot stud 23 for the temple 7 passes inwardly through the bottom of the cup and through the gear 22 and the temple head 21.

Angular tilting movement of the temple arm 6 on the temple 7 is limited by means of cooperating stops provided by the temple itself and a peripheral slot 24 in the cup of the pivot block 20 through which the temple 7 projects. A plate 25 engages the rim of the pivot block cup and retains the temple head 21 in place, this plate and the pivot stud 23 being retained in place by means of a screw 26 entering the adjacent end of the pivot stud 23, which enters but does not pass all of the way through the plate 25 and is shown as somewhat reduced in diameter back to a point within the temple head 21. By reason of the fact that the retaining plate 25 is somewhat yieldable and resilient, adjustment of the clamp screw 26 will cause the temple head 21 and its gear 22 to be gripped with more or less friction between the face of the plate 26 and that of the bottom of the cup on the pivot block 20, this arrangement thus forming a friction device in control of the rocking movement of the temple arm 6 for retaining the latter in any position of angular adjustment between the limiting stops provided by the slot 24 and the temple 7. In order to facilitate and accurately accomplish this angular adjustment a small pinion 27 within the box or cup formed by the pivot block 20 engages the gear 22 and has a stem journaled in the pivot block, this stem having fixed thereto a finger knob 28 at the outer side of the pivot block.

A suitable nose pad 29 is freely pivoted on a horizontal transverse pivot to the lower end of a nose bar 30 arranged in a vertical plane transverse to the main frame bar or channel bar 1 and extending downward from the latter at the front thereof. The nose bar 30 may slide longitudinally for vertical adjustment through a long guideway provided in the front of a pivoted guide block or pivot block 31 which at its rear is pivoted beneath the cross bar 1 on a horizontal transverse pivot between a pair of lugs provided on the lower end of the center block or anchor block 3, thereby to provide for forward and backward adjustment of the nose pad 29. The nose pad 29 may be rapidly adjusted up and down and securely held at any position of such adjustment by means of a quick acting or long pitch screw 32 which is journaled through the rearwardly turned upper end of the nose bar 30 and is threaded through the body of the pivot block 31. In the construction shown in the drawings this screw 32 is a double-thread screw. The extent of the pitch and the coarseness of the thread of this screw have been somewhat exaggerated for drafting reasons. It will be noted that the body of the pivot block 31 is of sufficient thickness to provide a long screw thread bearing for the screw 32, thereby assuring long wear and consequent accuracy of adjustment, most desirably the screw 32 being made of steel while the pivot block 31 is of duralumin. The upper end portion of the adjusting screw 32 is reduced to form a bearing shoulder below the rearwardly turned upper end of the nose bar 30 and is outwardly screw threaded to receive a small nut 33 which forms a bearing shoulder above the nose bar. A small finger knob 34 screws upon the upper end of the adjusting screw 32 and forms a jam nut or lock nut for the shoulder nut 33 and is itself thus frictionally locked thereby. The horizontal pivot of the nose bar 30 on the cross bar 1 is a friction pivot for frictionally retaining the nose bar in any position of angular adjustment for thus maintaining the nose pad 29 at different positions of forward and backward adjustment. A steel pivot pin 35 which is parallel to the cross bar 1 extends between and is fixed in the lugs of the center block 3 and is locked in place therein by means of a set screw 36 which screws into one of these lugs from the rear, as is shown in Figs. 3 and 4. The rear end of the nose bar pivot block 31 has a friction split clamp bearing between the pivot block lugs on the pivot pin 35 and the amount of friction desired in this bearing may be adjusted by means of a clamp screw 37, as shown in Figs. 3, 4 and 5, for thereby frictionally retaining the nose bar 30 in angularly adjusted position according to the particular forward or backward position desired for the nose pad 29.

Rigid stainless steel hanger arms 38, shown as in the form of flat strips, rigidly depending from the cross bar 1 intermediate of its ends, at opposite sides of the center block 3, rigidly carry the trial case lens holders. Each of the depending arms 38 is offset rearwardly at two places, once on transverse lines adjacent the cross bar 1, and again on diagonal lines at a lower point adjacent the top of the lens holder, thereby for bringing the lens holders to the proper distance from the eyes, at the rear of the cross bar 1. Each of these depending arms 38 is circularly curved outwardly and upwardly in J shape to provide a substantially semicircular lower end portion 39 which forms a part of the lens holder in one piece with the arm 38. Each of these semicircular lower arm portions 39 is provided with a plurality of lens cells.

In the construction shown, an arcuate rear lens cell 40, open at the top and shown as terminating upwardly somewhat short of the semicircular portion 39, particularly at the inner side thereof, is removably secured, as by means of screws, to the rear of the semicircular plate formed by the curved arm portion 39. Two lens cells are shown as provided at the front of the semicircular arm portion 39. In the construction shown, an outwardly graduated or calibrated plate 41, which extends upwardly at its inner end so as to be somewhat more than semicircular, is held in forwardly spaced relation to the rear plate 39 by means of a pair of notched spacers 42 adjacent the upper ends of the front plate 41. Adjacent the bottom of this cell a peripherally grooved wheel 43 extends into the cell between the front and rear plates 41 and 39 and is fixed upon a shaft 44 journaled in downward extensions of these plates. This shaft 44 is extended forwardly through a bearing sleeve 45 carried by the front plate 41 and at its forward end has fixed thereon a small finger knob 46 for rotating the wheel 43. The lens in the lens cell between the spacers 42 rests with its weight upon the wheel 43 within the peripheral groove thereof and may be rotated thereby for axially adjusting the lens and such adjustment may be quickly effected by reason of the fact that the lens-adjusting wheel 43 is of considerably larger diameter than the finger knob 46. A front lens cell is provided at the front of the calibrated plate 41 by means of three forwardly projecting notched studs 47, the upper two of which are in alignment with the spacers 42 and may be supported by the same screws which hold these spacers. It will be noted that the depending arms 38 are amply strong for rigidly supporting the trial case lens holders together with the lenses carried thereby in the lens cells thereof and that these arms are subjected to no other strains, in view of the fact that the temples 7 have no attachment to or connection with either the arms 38 or the lens holders thereon.

At each side of the center block 3 a slide block 48 closely fits in the slideway provided within the tubular bar formed by the channel bar 1 and its rear plate 5 and at its front side projects downwardly through and is further guided in the slot 2 formed between the front edge of the lower cut-away flange of the channel bar 1 and the inner side of the lower edge portion of the rear plate 5, as shown in Figs. 4 and 6. The upper end portion of the depending arm 38 extends upwardly through the slot 2 to the upper flange of the channel bar 1, overlapping upon and being countersunk into the front of the slide block 48 flush with the front face thereof and is firmly secured thereto by means of screws, as shown in Figs. 4 and 6. One of these screws extends forward in the form of a stud 49 just below the channel bar 1 substantially flush with the front face thereof and forms an index to cooperate with a scale shown in Fig. 1 as provided on the front face of this bar 1, these markers 49 cooperating with the scale to indicate the pupillary distance of the lens holders, that is, in each instance the distance from a median vertical plane of the axis of a lens carried by the lens holder.

Each of the slide blocks 48 rigidly carries an inwardly projecting guide bar 50 parallel with the slideway in the cross bar 1 and countersunk into the rear face of the slide block 48 flush therewith and firmly secured thereto by means of screws, similarly to the attachment of the arms 38. In order that these guide bars 50 may extend past each other in overlapping relation they are vertically offset from one another, the guide bar 50 appearing in Fig. 6 and at the left in Fig. 4 being carried by the upper part of its slide block 48, while the other guide bar 50, appearing at the right in Fig. 4, is carried by the lower part of the other slide block 48. These guide bars 50 lie flat against the inner face of the web of the channel bar 1, and the center block 3 in its rear face is provided with upper and lower transverse slots which snugly but slidably receive the guide bars 50 and form a slideway therefor, as shown most clearly in Fig. 5. Also each of the slide blocks 48 is provided with a similar transverse slot forming a guideway for guiding the adjacent end portion of the guide bar 50 carried by the other slide block, one of these guide slots being shown in Fig. 6 in the rear face of the lower part of the slide block, while the guide slot of the other slide block is in the upper part of its rear face, as will be readily understood. By reason of this construction and arrangement the guide bars 50 will at all times be guided adjacent to their free ends, thereby making such guiding most effective in preventing the possibility of any angular movement in any direction of the slide blocks 48 and whereby precise alignment of the axes of the lenses carried by the lens holders is obtained. It will be noted of the construction shown that in the wider adjustments of the pupillary distance between the trial case lens holders, in which the slide blocks 48 are more widely separated, the guide bars 50 will be effectively guided by the middle guide block or center block 3, while in the near pupillary adjustments of the slide blocks 4, in which the guiding effect of the center block 3 might not be so effective, each of the slide blocks 48 will then effectively guide the adjacent free end portion of the guide bar which projects from the other slide block, this latter guiding effect beginning to take place at about a middle point of adjustment of the slide blocks 48 along the cross bar 1 and continuing throughout any further inward adjustment of the slide blocks 48. This manner of guiding the slide blocks 48 by means of the guide bars 50 provides a smooth and free sliding movement of these blocks and eliminates the usual defect in trial frames of the inability of maintaining a precise alignment of the axes of the lenses.

The pupillary adjustment is individual for each eye and therefore separate or individual means are provided for effecting and maintaining such adjustment of the trial case lens holders. Such means will be first described with reference to the trial case lens holder and its slide block 48 for the right eye, which in the drawings appears at the left in Figs. 1 and 2 and at the right in Fig. 4, which is a rear view clearly showing the operating parts now to be described. In the construction shown an adjusting screw 51 parallel with the slideway provided in the tubular cross bar, formed by the channel bar 1 and its closure plate 5, is screw threaded through the slide block 48 within this tubular cross bar and extends at its free inner end to a point adjacent the center block 3. This screw 51 has a somewhat reduced outer shaft portion 52 journaled in the end block 4, which provides a long bearing therefor through a tubular reduced outward extension or neck formed on the end block 4. The screw 52 is provided with a smooth shoulder-forming portion 53 which is countersunk into a shoulder-forming enlargement in the inner end of the end block 4 and prevents outward movement of this screw. Outward from the shaft portion 52 of the screw 51 is a squared portion 54 the largest or diagonal diameter of which is the same as that of the shaft portion 52 and which thus forms a series of four outwardly directed shoulders flush with the end of the tubular neck on the end block 4. Outward from this square portion 54 the screw 51 terminates in a reduced screw threaded end portion 55. A knurled finger knob 56 is shown as of cylindrical cup shape and as provided with a tubular inwardly extending neck portion, the bore of the larger outward part of which is the same as that of the shaft portion 52 of the screw 51, this bore extending entirely through finger knob 56 and at its extreme inner end being reduced in diameter on four sides to form a square socket portion to receive the square portion 54 of the screw 51, as is shown in Fig. 12. An internally screw threaded stud 57 screws over the reduced screw threaded end 55 of the screw 51 and by reason of the abutment of its inner end with the offsets or shoulders formed in the neck of the finger knob 56 where the bore in the finger knob is squared, as above described, is thereby effective to retain the finger knob 56 on the outer end of the screw 51, the inner end of the tubular neck of the finger knob abutting against the outer end of the tubular neck on the end block 4, thereby to prevent any inward movement of the screw 51, as is shown in Fig. 4.

The screw 51 is a long pitch or quick acting screw for thereby effecting a rapid pupillary adjustment of the trial case lens holder carried by the depending arm 38, which is fixed to the adjustable slide block 48. The pitch of the thread of this screw 51 is made such as securely to maintain the slide block 48 in adjusted position. The screw 51 has a left hand thread and in the construction shown in the drawings this is a double-thread screw, of which both the pitch and the coarseness of the thread have been somewhat exaggerated for drafting reasons.

The construction and operation of the means for effecting and maintaining the adjustment of the other slide block 48 which carries the trial case lens holder for the left eye are the same as that described for the right eye with the exception that an adjusting screw 58 having a right hand thread is provided. The reason for the left hand thread of the screw 51 and the right hand thread of the screw 58 is for the convenience of the operator in turning the respective finger knobs 56. If reference will be had to the front view of Fig. 1 it will be noted that the finger knob 56 there appearing at the left hand side and which rotates the screw 51 having the left hand thread, may be most conveniently rotated with the left hand of the operator; while the finger knob 56 at the right side of Fig. 1, for rotating the screw 58 having the right hand thread, may be most conveniently rotated by the right hand of the operator. The construction and arrangement above described have been found to be the most convenient to the operator in making adjustments. It will be noted that the screws 51 and 58 have long bearings in the slide blocks 48 and in the end blocks 4. These screws may desirably be of steel and the slide blocks 48 of brass.

It is believed that the operation and manner of use have already been fully described along with the description of the construction and that nothing more remains to be added in that respect.

It is obvious that various modifications may be made in the embodiment of the invention shown in the drawings and above particularly described, within the principle and scope of the invention as defined in the appended claims.

I claim:

1. A trial frame having, in combination, a straight rigid cross bar extending from side to side to form a main frame part, gradually tapering stiffly resilient curved temple arms rigidly connected at their larger inner ends to the outer ends of the cross bar and extending therefrom on gradually merging curved lines outwardly and rearwardly and downwardly in substantial conformation with the shape of the head, a temple connected to the outer end of each of said arms, and a pair of trial case lens holders below and carried by said cross bar independently of said temple arms.

2. A trial frame having, in combination, a straight rigid cross bar forming a main frame part, curved gradually tapering stiffly resilient temple arms of trough shape in cross section rigidly connected at their larger inner ends to the respective outer ends of the cross bar and extending therefrom on gradually merging curved lines outwardly and rearwardly and downwardly in substantial conformation with the shape of the head, resilient temples connected respectively to the outer ends of the temple arms, a pair of hanger arms rigidly depending from the cross bar intermediate of its ends in laterally spaced relation, and a pair of trial frame lens holders rigidly carried by said hanger arms.

3. The invention defined in claim 2 in which each of said temples is of rounded trough shape in cross section with its rounded side directed inwardly towards the other temple and thus towards the head of the patient to provide a smooth surface in contact therewith.

4. A trial frame having a pair of temples each of which is of rounded trough shape in cross section with its rounded side directed inwardly towards the other temple and thus towards the head of the patient to provide a smooth surface in contact therewith.

5. A trial frame having, in combination, a straight rigid cross bar extending from side to side to form a main frame part, curved temple arms rigidly connected at their inner ends to the outer ends of the cross bar and extending therefrom outwardly and rearwardly and downwardly, a temple connected to the outer end of each of said arms, a pair of trial frame lens holders below and carried by said cross bar independently of said temple arms, a pivot piece forming a connection between a temple and a temple arm and providing a vertical pivot and a transverse horizontal pivot, a screw cooperating with the vertical pivot for positively forcing the temple inward towards the other temple, cooperating stops for positively limiting the relative angular movement of the temple arm and temple on the horizontal pivot, and an automatically-releasing spring detent device for yieldingly holding the temple arm at each of its limits of angular movement relatively to the temple, said detent device comprising a spring disc interposed between adjacent faces of the pivoted parts and anchored to one of said parts, said disc and the other said part having a yieldable interengaging relation by means of a recess provided in one and a projection provided on the other to engage in the recess for yieldably maintaining the pivotal adjustment of said parts.

6. A trial frame having, in combination, a straight rigid cross bar extending from side to side to form a main frame part, curved temple arms rigidly connected at their inner ends to the outer ends of the cross bar and extending therefrom outwardly and rearwardly and downwardly, a temple connected to the outer end of each of said arms, a pair of trial case lens holders below and carried by said cross bar independently of said temple arms, a pivot piece forming a connection between a temple and a temple arm and providing a vertical pivot and a transverse horizontal pivot, a screw cooperating with the vertical pivot for positively forcing the temple inward towards the other temple, cooperating stops for positively limiting the relative angular movement of the temple arm and temple on the horizontal pivot, and an automatically-releasing spring detent device for yieldably holding the temple arm at each of its limits of angular movement relatively to the temple, said detent device comprising a spring disc interposed between adjacent faces of the pivoted parts and anchored to one of said parts and having a substantially V-shaped diametral ridge, the other said part having therein a pair of diametral crossed grooves in either of which the V-shaped ridge of the spring disc may engage at one or the other of the limits of the pivotal movement.

7. In a trial frame, in combination, a temple, a frame part, and means for connecting the temple to the frame part including a substantially horizontal pivotal connection comprising cooperating stops for positively limiting the relative angular movement of the frame part on the temple, and an automatically-releasing spring detent device for yieldably holding said frame part at each of its limits of angular movement relatively to the temple, said detent device comprising a spring disc interposed between adjacent faces of the pivoted parts and anchored to one of said parts, said disc and the other said part having a yieldable interengaging relation by means of a recess provided in one and a projection provided on the other to engage in the recess for yieldably maintaining the pivotal adjustment of said parts.

8. In a trial frame, in combination, a temple, a frame part, and means for connecting the temple to the frame part including a substantially horizontal pivotal connection comprising cooperating stops for positively limiting the relative angular movement of the frame part on the temple, and an automatically-releasing spring detent device for yieldably holding said frame part at each of its limits of angular movement relatively to the temple, said detent device comprising a spring disc interposed between adjacent faces of the pivoted parts and anchored to one of said parts and having a substantially V-shaped diametral ridge, the other said part having therein a pair of diametral crossed grooves in either of which the V-shaped ridge of the spring disc may engage at one or the other of the limits of the pivotal movement.

9. In a trial frame, in combination, a straight rigid cross bar of channel shape forming a main frame part, a cover strip for the channel extending along the full length of and firmly secured to the cross bar to form in effect a part thereof, a pair of temple arms formed in one piece with the cover strip as end extensions therefrom so as to form therewith a one piece temple yoke, and temples connected to the outer ends of the temple arms.

10. In a trial frame, in combination, a cross piece in the form of a straight strip, a pair of temple arms formed in one piece of material with the cross piece and extending as end continuations thereof on curved lines outwardly and rearwardly and downwardly, such temple arms being of trough shape in cross section and gradually tapering outwardly so as to be stiffly resilient, resilient temples connected to the lower ends of the temple arms, a straight rigid cross bar forming a main frame part firmly secured to the cross piece, a nose bar mounted on the main frame part, and a pair of trial case lens holders below and carried by the main frame part.

11. A trial frame having, in combination, a straight rigid cross bar of channel shape forming a main frame part and having one of its flanges cut away to provide a longitudinal slot, a plate in the form of a strip firmly secured to the cross bar to close the channel with the exception of said slot and forming with said channel-shaped cross bar a tubular longitudinally slotted cross bar, an anchor block firmly secured in said tubular cross bar at the middle of its length and projecting to the outside thereof through said slot, a nose bar connected to the anchor block, a pair of slide blocks respectively at opposite sides of the anchor block within the tubular cross bar slidable longitudinally thereof and held thereby against angular movement in any direction, a pair of depending arms respectively having at their upper ends a rigid connection through said slot to the respective slide blocks, and a pair of trial case lens holders respectively rigidly connected to the lower ends of the depending arms.

12. The invention defined in claim 11 in combination with temple arms formed in one piece with and as outward continuations from said channel-closing plate or strip, and temples connected to the outer ends of the temple arms.

13. In a trial frame, in combination, a channel-shaped cross bar having upper and lower flanges and with its lower flange cut away to form a longitudinal slot, a cover plate closing the channel of the cross bar with the exception of said slot and firmly secured thereto to form a reinforcement therefor and forming therewith a tubular bar, a guide block firmly secured in place in the channel of the cross bar at the middle of the latter, slide blocks guided in the channel of the cross bar for sliding movement longitudinally thereof at opposite sides of the guide block respectively, depending arms respectively rigidly carried by the slide blocks, trial case lens holders respectively rigidly carried by the lower ends of said arms, and guide bars guided by the guide block and respectively rigidly carried by the slide blocks to slide therewith.

14. In a trial frame, in combination, a channel-shaped cross bar having upper and lower flanges and with its lower flange cut away to form a longitudinal slot, a cover plate closing the channel of the cross bar with the exception of said slot and firmly secured thereto to form a reinforcement therefor and forming therewith a tubular bar, a guide block firmly secured in place in the channel of the cross bar at the middle of the latter, slide blocks guided in the channel of the cross bar for sliding movement longitudinally thereof at opposite sides of the guide block respectively, depending arms respectively rigidly carried by the slide blocks, trial case lens holders respectively rigidly carried by the lower ends of said arms, and guide bars guided by the guide block and respectively rigidly carried by the slide blocks to slide therewith, each of the slide blocks being provided with a guideway for guiding the adjacent end portion of the guide bar carried by the other slide block.

15. A trial frame having, in combination, a channel-shaped cross bar forming a main frame part and having upper and lower flanges of which the lower flange is cut away to form a longitudinal slot, an anchor block firmly secured in place in the channel at the middle of the length of the cross bar, end blocks firmly secured to the cross bar and closing the ends of its channel, slide blocks respectively guided in the channel at opposite sides of the anchor block to slide longitudinally of the cross bar, depending arms respectively rigidly carried by the slide blocks by means of a connection thereto through said longitudinal slot, trial case lens holders rigidly carried by the lower ends of said arms, a nose bar carried by the anchor block and having a connection thereto through said longitudinal slot, guide bars guided by the anchor block and respectively rigidly carried by the slide blocks, a cover plate closing the channel in the cross bar and firmly secured thereto to form a reinforcement thereof, screws journaled in the respective end blocks of the cross bar with finger knobs at the outside thereof for manipulation and having screw threaded engagement in the slide blocks for slidably adjusting the latter to effect pupillary adjustment of the lens holders, temple arms formed in one piece with said cover plate and extending respectively as end extensions thereof outwardly and rearwardly and downwardly on curved lines, and temples connected to the outer ends of the temple arms.

16. In a trial frame, in combination, a main frame part, a pair of laterally spaced depending arms guided at their upper ends for substantially horizontal sliding movement on the main frame part, a pair of trial case lens holders one of which is carried by the lower end portion of each of said arms, and a guide bar projecting rigidly inwardly from the upper end portion of each of said arms in parallel overlapping relation with the other guide bar and guided for substantially horizontal parallel sliding movement on the main frame part to partake of the sliding movement of said arms for thereby maintaining the axial alignment of the lens holders, the upper end of each of said arms being provided with a guideway for guiding the adjacent end portion of the guide bar which projects from the other arm.

In witness whereof, I hereunto subscribe my signature.

HANS CLEMENT.